United States Patent
Campagnolo

(10) Patent No.: US 6,607,056 B2
(45) Date of Patent: Aug. 19, 2003

(54) BRAKE APPARATUS FOR A BICYCLE AND BICYCLE COMPRISING THIS APPARATUS

(75) Inventor: Valentino Campagnolo, Vicenza (IT)

(73) Assignee: Campagnolo Srl (IT)

( * ) Notice: Subject to any disclaimer, the term of this patent is extended or adjusted under 35 U.S.C. 154(b) by 0 days.

(21) Appl. No.: 09/812,689

(22) Filed: Mar. 21, 2001

(65) Prior Publication Data

US 2001/0027901 A1 Oct. 11, 2001

(30) Foreign Application Priority Data

Apr. 11, 2000 (IT) ..................................... TO2000A0339

(51) Int. Cl.[7] .................................................. B62L 1/02
(52) U.S. Cl. ............................... 188/24.12; 188/24.16; 188/2 D; 74/489; 74/502.2
(58) Field of Search ........................... 108/24.12, 24.15, 108/24.16, 24.11, 24.21, 24.14, 2 D; 74/489, 502.2

(56) References Cited

U.S. PATENT DOCUMENTS

| 4,480,720 A | * | 11/1984 | Shimano | 188/24.15 |
| 4,773,510 A | * | 9/1988 | Sato | 188/24.16 |
| 5,176,042 A | * | 1/1993 | Bean et al. | 74/502.2 |
| 5,425,434 A | * | 6/1995 | Romano | 188/24.19 |
| 5,924,328 A | * | 7/1999 | Okajima et al. | 188/2 D |
| 5,979,266 A | * | 11/1999 | Nagano | 74/502.2 |

* cited by examiner

Primary Examiner—Jack Lavinder
Assistant Examiner—Mariano Sy
(74) Attorney, Agent, or Firm—Volpe and Koenig, P.C.

(57) ABSTRACT

A brake apparatus for a bicycle capable of applying a higher braking force on the front wheel (3) and a lower braking force on the rear wheel (4) given the same force exerted on the levers (7, 8) controlling the front brake (5) and the rear brake (6) so to prevent early locking of the rear wheel of the bicycle during braking while leaving the cyclist the possibility to separately control the front brake (5) and the rear brake (6).

20 Claims, 3 Drawing Sheets

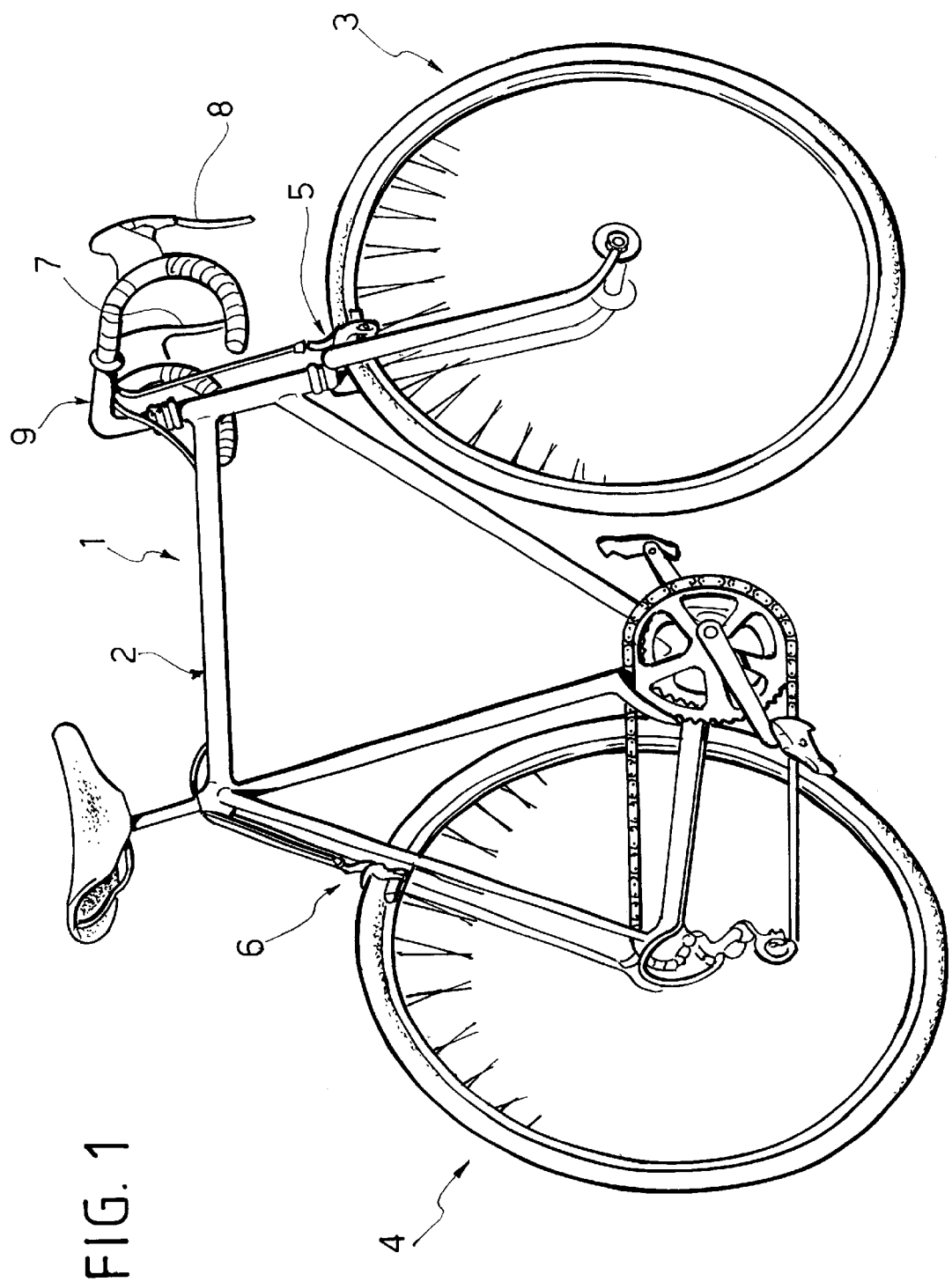

BRAKE APPARATUS FOR A BICYCLE AND BICYCLE COMPRISING THIS APPARATUS

BACKGROUND OF THE INVENTION

This invention relates to brake apparatuses for bicycle, of the known type, comprising:
a front wheel braking device of the bicycle comprising:
  a front brake, and
  a front brake control device, comprising:
    a supporting body,
    a front brake control lever articulated around the supporting body and,
    a transmission connecting the front brake and the front brake control lever, and
a rear wheel braking device of the bicycle comprising:
  a rear brake, and
  a rear brake control device, comprising:
    a supporting body,
    a rear brake control lever articulated around the supporting body and,
    a transmission connecting the rear brake and the rear brake control lever.

In bicycles, as in all vehicles, the force by which the front wheel is pressed on the ground increases and the force by which the rear wheel is pressed on the ground decreases during braking, reason for which the grip of the rear wheel with respect to the ground is reduced with respect to the front wheel in equal conditions of friction. In other words, the maximum braking action which can be applied to the front wheel without locking it and causing it to slip on the ground is higher than that applicable to the rear wheel. Consequently, when braking to the limit of grip, the necessity of differentiating between the braking action of the front wheel and the rear wheel arises. On conventional bicycles, the front brake and the rear brake are controlled by means of two separate levers which are operated manually, reason for which, in theory, cyclists can employ their sensitivity and apply a different braking force on the front wheel and on the rear wheel. However, firstly, not all cyclists have the sensitivity to control the front wheel and the rear wheel in a differentiated fashion to obtain the maximum possible braking without locking the wheels. Secondly, in emergency conditions, i.e. when the maximum possible braking must be applied in the shortest possible time, this result is not achievable.

SUMMARY OF THE INVENTION

In order to account for these requirements, various braking systems for bicycles have been proposed in the past which comprise a centralised control device to operate the front brake and the rear brake at the same time. This device is connected to the two brakes by means of the respective conformed transmissions and arranged in such a way to obtain two different braking actions on the front wheel and on the rear wheel from a single control action. However, these devices are not very commonly implemented both because they are relatively complicated and because cyclists always prefer having two available separate brake controls for the front wheel and for the rear wheel, especially in the case of competition bicycles.

In order to solve all of the aforesaid problems, this invention relates to a brake apparatus for bicycle comprising:
a front wheel braking device of the bicycle comprising:
  a front brake, and
  a front brake control device, comprising:
    a supporting body,
    a front brake control lever articulated around the supporting body and,
    a transmission connecting the front brake and the front brake control lever, and
a rear wheel braking device of the bicycle which is fully independent from the front wheel braking device comprising:
  a rear brake, and
  a rear brake control device, comprising:
    a supporting body,
    a rear brake control lever articulated around the supporting body and,
    a transmission connecting the rear brake and the rear brake control lever characterised in that the front braking device is capable of applying a braking force on the front wheel which is higher than that applied on the rear wheel given the same force exerted on the levers controlling the front brake and the rear brake.

In order to achieve this, this invention moves against a technical prejudice which has existed to the current day. This is because, the proposed forms of embodiment aimed at obtaining differentiated braking of the two wheels of a bicycle always comprised a centralised control suitable for causing in any way a different braking action on the two wheels of the bicycle. Conversely, in the case of this invention, two fully separate braking devices for the front wheel and the rear wheel are still used, but these braking devices are conformed to exert two different braking actions (specifically, a higher braking action on the front wheel) given the same control force exerted on the control lever of the front brake and on the control lever of the rear brake.

In a first form of embodiment, this result is obtained by mutually differentiating the brake and the rear brake. Particularly, in the apparatus according to this invention, the front brake is a so-called "dual-pivot" brake. The term "dual-pivot" here is used to intend, for example, a brake of the type described and illustrated in U.S. Pat. No. 5,425,434 by the Applicant. This brake comprises two arms holding respective brake shoes, where a first arm is articulated around a first pivot pin, secured to the bicycle frame, and the second arm is articulated around a second pivot pin, spaced from the first pivot pin and held by an auxiliary support, which in turn is rigidly secured to the bicycle frame. Furthermore, a rocking member is arranged between the two arms to multiply the braking load. According to this first form of embodiment of the invention, the rear brake, on the contrary, is a conventional brake with a single pivot pin, where the two arms holding the brake shoes are mutually articulated around the same pin secured to the frame of the bicycle. Naturally, given equal dimensioning of the dual-pivot brake and of the single pivot brake, the braking action obtained on the wheel for the same force applied to the control wire of the brake is higher in the case of the dual pivot brake. In this way, cyclists can avail of a brake apparatus which always ensures higher braking of the front wheel easily permitting to obtain the maximum possible braking efficiency in all conditions of grip with ground, in all cases always offering cyclists the possibility to separately control the front brake and the rear brake.

In a second form of embodiment of this invention, the front braking device and the rear braking device is differentiated by means of a different positioning of the point of the brake control lever to which the respective control wire is connected. This solution naturally refers to the conventional case in which the transmission connecting each control lever to the respective brake consists of a flexible wire, with one extremity connected to the control lever in a point of the lever which is situated on the opposite side of the pivoting axis of the lever with respect to the actuation end of the lever. In the case of this invention, the control lever of the front brake is connected to the respective flexible wire in a point which is closer to the pivoting axis of the lever with respect to the case of the rear brake control lever. Thanks to this characteristic, given the same force exerted on the actuation end of the control lever, the control lever of the front wheel generates on the flexible wire a higher force with respect to the case of the control lever of the rear brake.

BRIEF DESCRIPTION OF THE DRAWINGS

Studies and experiments conducted by the Applicant have ascertained that the optimal differentiation of load on the front brake and load on the rear brake corresponds to a ratio of approximately 1.3:1.

Characteristics and advantages of this invention will be illustrated with reference to a preferred embodiment as non-limiting examples in the enclosed drawings, whereas:

FIG. 1 is a schematic view of a competition bicycle employing a brake apparatus according to this invention.

DETAILED DESCRIPTION OF THE INVENTION

Figure 3:
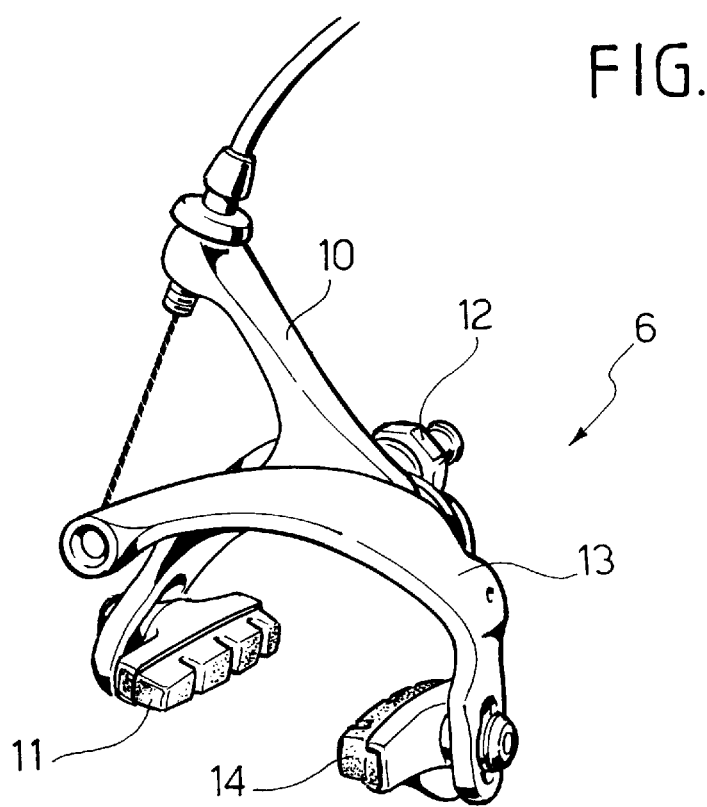
FIGS. 2 and 3 are prospective views of the front brake and the rear brake of a first form of embodiment of the braking device according to this invention and FIGS. 4 and 5 are a cross-section view of the control levers of the front brake and the rear brake in a second form of embodiment of this invention.

In FIG. 1, number 1 indicates generally denotes a competition bicycle comprising a frame 2, a front wheel 3 and a rear wheel 4 to which a front brake 5 and a rear brake 6 are associated and controlled by means of the respective flexible wires by a lever 7 controlling the front brake 5 and a lever 8 controlling the rear brake 6, associated to the handlebar 9 of the bicycle.

Figure 2:
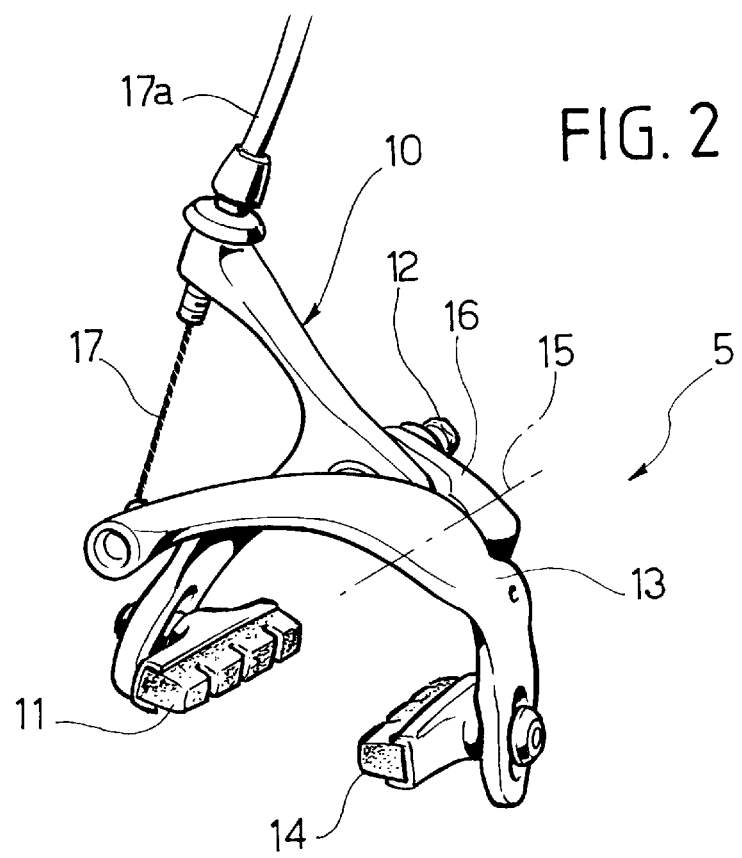

In the first form of embodiment of this invention, the structure and conformation of the front brake 5 and the rear brake 6 are illustrated in accompanying figures 2 and 3. As shown, the front brake 5 is of the "dual-pivot" type which first arm 10 holds a first braking shoe 11 and is articulated around a first pivot pin 12 which is secured to the frame of the bicycle. A second arm 13 holds a second braking shoe 14 and is articulated around a second pivot pin (of which the axis 15 only is illustrated in figure 2) and is connected to an auxiliary support 16, which is also rigidly secured to the bicycle frame. Furthermore, as described, for example, in U.S. Pat. No. 5,425,434, a rocker member (not visible in FIG. 2) is articulated around the axis 15 which is used to multiply the braking load. The brake 5 is operated by a flexible metallic wire 17 one extremity of which is secured to an end of the arm 13 opposite to the shoe 14 and the other extremity is connected to the respective brake control lever, the arm 10 conversely being secured to a sheath 17a of the wire. Always according to the first form of embodiment of this invention, the rear brake 6 is on the other hand of the type illustrated in figure 3, simply including two arms 10, 13 mutually articulated around the same pin 12 to be secured to the bicycle frame and holding respective braking shoes 11, 14. The arrangement is such that the two brakes 5, 6 are substantially of equal dimensions and have arms 10, 13 which are also substantially similar to each other. However, the dual-pivot brake is able to generate a higher braking action from the same value of force applied to the control lever 7. Consequently, the cyclist can separately control the front brake and the rear brake with two levers 7, 8 by exerting the same force on the two levers, but obtaining a higher braking action on the front brake and a lower braking action on the rear brake.

Figure 4:
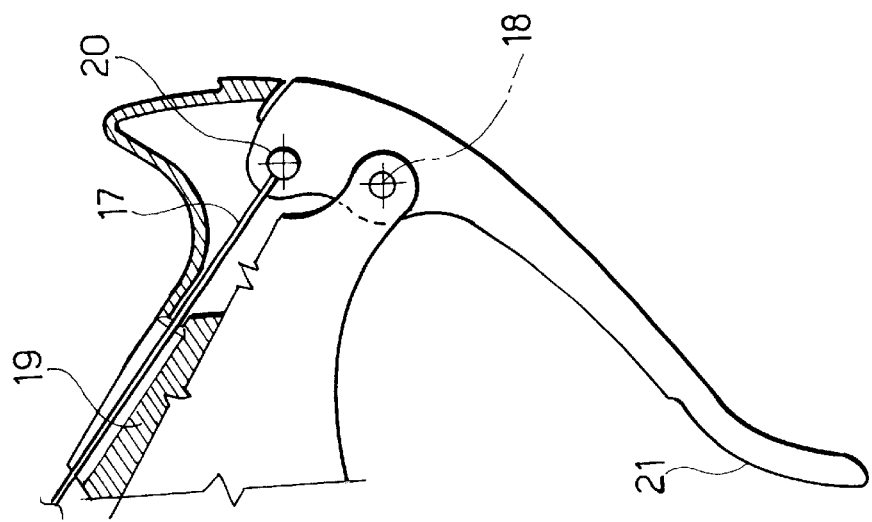
Figure 5:
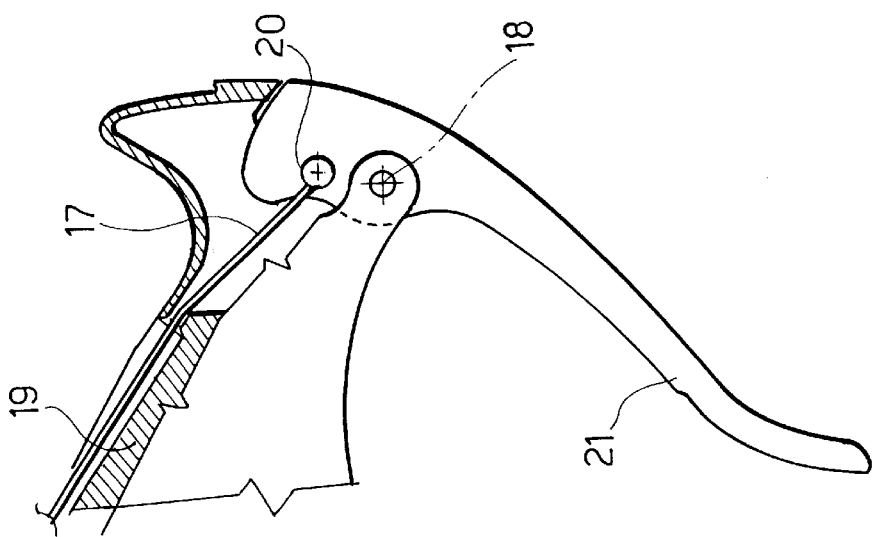

The FIGS. 4, 5 refer to a second form of embodiment, in which the braking action is differentiated between the front brake 5 and the rear brake 6 by means of a different design of the control levers 7, 8.

With references to the FIGS. 4, 5, each lever comprises a body articulated around an axis 18 on a supporting structure 19 secured to the handlebar of the bicycle. The lever is connected at point 20 to the extremity of the respective flexible control wire 17 on the side opposite to the pivoting axis 18 with respect to the portion of the brake lever actuation end 21. In this form of embodiment of the invention, the point 20, in the case of the lever 7 controlling the front brake is closer to the axis 18 with respect to the case of the lever 8 controlling the rear brake. Consequently, the same force applied to the actuation end 21 of the two levers 7 and 8 a higher force is transmitted in the case of the front brake and a lower force in the case of the rear brake.

In the description above, it is apparent how the brake apparatus according to this invention makes the cyclist able to obtain a differentiated braking effect, particularly a higher braking on the front wheel and a lower braking on the rear wheel from a same load applied to the control levers of the front brake and of the rear brake, so to constantly ensure braking in the best safety conditions and at the same time giving the cyclist the possibility of controlling the front brake and the rear brake separately.

Naturally, numerous changes can be implemented to the construction and forms of embodiment of the invention herein envisaged, all comprised within the context of the concept characterising this invention.

This is because, obviously, the principle underlying this invention pertains to mutually differentiating the front braking device and the rear braking device so to obtain the result illustrated above. In the forms of embodiment herein illustrated, this purpose was obtained by mutually differentiating either the front brake and the rear brake, or the lever controlling the front brake and the lever controlling the rear brake. However, such differentiation may be implemented in any point of the braking device, which is the brake apparatus in total, of the brake control device and of the transmission connecting the parts.

What is claimed is:

1. Brake apparatus for a bicycle, comprising
a front wheel braking device of the bicycle comprising:
a front dual pivot brake having a given dimension, and
a front brake control device, comprising:
a supporting body,
a front brake control lever articulated on the supporting body and,
a transmission member connecting the front brake and the front brake control lever, and
a rear wheel braking device of the bicycle which is fully independent from the front wheel braking device comprising:
a rear single pivot brake having the given dimension of the front brake, and
a rear brake control device, comprising:
a supporting body, a rear brake control lever articulated on the supporting body and,
a transmission member connecting the rear brake and the rear brake control lever,
wherein the front wheel braking device is capable of applying a braking force on the front wheel which is higher than that applied on the rear wheel when substantially the same force is exerted on the levers controlling the front brake and the rear brake.

2. Brake apparatus according to claim 1 wherein the front brake is capable of applying a braking force to the front wheel which is higher than that applied to the rear wheel by means of the rear brake given the same force applied to the transmission members connecting the brakes and the respective control levers.

3. Brake apparatus according to claim 1, wherein the transmission member connecting each control lever to the respective brake is comprised of a flexible wire, one end of which is connected to the respective control lever at a point located on an opposite side of a pivoting axis of the control lever with respect to the articulation end of the control lever wherein the lever controlling the front brake is connected to the respective wire at a point which is closer to the pivoting axis of the lever with respect to the case of the lever controlling the rear brake.

4. Brake apparatus according to claim 1 wherein the braking force applicable on the rear wheel and on the front wheel given the same force exerted on the control levers is in a ratio of approximately 1.3:1.

5. A bicycle including a brake apparatus according to claim 1.

6. Brake apparatus for a bicycle comprising a front wheel braking device comprising a front dual pivot brake having a given dimension and a front brake control device, the front brake control device comprising a support body and a front brake control lever articulated on the support body, a rear wheel braking device which is fully independent from the front wheel braking device comprising a rear single pivot brake having the given dimension of the front brake and a rear brake control lever for controlling the rear brake on which a force can be exerted, wherein the front wheel braking device is capable of applying a braking force on the front wheel which is higher than that applied on the rear wheel when substantially the same force is exerted on the control levers.

7. Brake apparatus according to claim 6 wherein the front brake is capable of applying a braking force to the front wheel which is higher than that applied to the rear wheel by the rear brake when substantially the same force is exerted on the control levers.

8. Brake apparatus according to claim 6 wherein each control lever controls the respective brake by means of a flexible wire, one end of which is connected to the respective control lever at a point located on an opposite side of a pivoting axis of the control lever with respect to the articulation end of the control lever wherein the lever controlling the front brake is connected to the respective wire at a point which is closer to the pivoting axis of the lever with respect to the case of the lever controlling the rear brake.

9. Brake apparatus according to claim 6 wherein the braking force applicable on the rear wheel and on the front wheel when substantially the same force is exerted on the control levers is in a ratio of approximately 1.3:1.

10. A bicycle including a brake apparatus according to claim 6.

11. Brake apparatus according to claim 6 wherein a rear brake control device is comprised of a supporting body having said rear brake control lever articulated thereon.

12. Brake apparatus according to claim 6 further comprising a first transmission member connecting the front brake and the front brake control lever and a second transmission member connecting the rear brake and the rear brake control lever.

13. Brake apparatus for a bicycle, comprising
a front wheel braking device of the bicycle comprising:
a front brake, and
a front brake control device, comprising:
a supporting body,
a front brake control lever articulated on the supporting body and,
a transmission member connecting the front brake and the front brake control lever, and
a rear wheel braking device of the bicycle which is fully independent from the front wheel braking device comprising:
a rear brake, and
a rear brake control device, comprising:
a supporting body,
a rear brake control lever articulated on the supporting body and,
a transmission member connecting the rear brake and the rear brake control lever,
wherein the front wheel braking device is capable of applying a braking force on the front wheel which is higher than that applied on the rear wheel when substantially the same force being exerted on the levers controlling the front brake and the rear brake,
wherein each transmission member connecting each control lever to the respective brake is comprised of a flexible wire, one end of which is connected to the respective control lever at a point located on an opposite side of a pivoting axis of the control lever with respect to the articulation end of the control lever wherein the lever controlling the front brake is connected to the respective wire at a point which is closer to the pivoting axis of the lever with respect to the case of the lever controlling the rear brake.

14. Brake apparatus for a bicycle comprising a front wheel braking device comprising a front brake and a front brake control device, the front brake control device comprising a support body and a front brake control lever articulated on the support body, a rear wheel braking device which is fully independent from the front wheel braking device comprising a rear brake and a rear brake control lever for controlling the rear brake on which a force can be exerted, wherein the front wheel braking device is capable of applying a braking force on the front wheel which is higher than that applied on the rear wheel when substantially the same force is exerted on the control levers,
wherein each control lever controls the respective brake by means of a flexible wire, one end of which is connected to the respective control lever at a point located on an opposite side of a pivoting axis of the control lever with respect to the articulation end of the control lever wherein the lever controlling the front brake is connected to the respective wire at a point which is closer to the pivoting axis of the lever with respect to the case of the lever controlling the rear brake.

15. Brake apparatus for a bicycle comprising a front wheel braking device comprising a front brake and a front brake control device, the front brake control device comprising a support body and a front brake control lever articulated on the support body, a rear wheel braking device which is fully independent from the front wheel braking device comprising a rear brake and a rear brake control lever for controlling the rear brake on which a force can be exerted, a first transmission member connecting the front brake and the front brake control lever and a second transmission member connecting the rear brake and the rear brake control lever, wherein the front wheel braking device applies a braking force on the front wheel which is higher than that applied on the rear wheel when substantially the same force is exerted on both control levers.

16. A set of brake control assemblies for fixing to a two wheeled cycle having a braking assembly associated with each wheel and a control wire associated with a respective braking assembly and a respective control assembly, the set of control assemblies comprising:
   a first brake assembly which has;
      a defined location on a body for attaching a lever in a pivotal connection;
      a lever having a first end that is a connection point for receiving a control wire and a second end for rider activation that are disposed on opposite sides of a pivot pin aperture with the connection point and pivot pin aperture being set apart by a predetermined distance; and
      a pin located in the pivot pin aperture and attached to the body in the defined location; and,
   a second brake assembly which has;
      a defined location on a body for attaching a lever in a pivotal connection;
      a lever having a first end that is a connection point for receiving a control wire and a second end for rider activation that are disposed on opposite sides of a pivot pin aperture with the connection point and pivot pin aperture being set apart by a predetermined distance; and
      a pin located in the pivot pin aperture and attached to the body in the defined location;
   wherein the predetermined distance between the connection point and pivot pin aperture of the second brake assembly lever is less than the predetermined distance between the connection point and pivot pin aperture of the first brake assembly lever.

17. The assemblies of claim 16 wherein a separate and independent control wire extends between each of the first and second respective braking assemblies and control assemblies.

18. Brake apparatus for a bicycle, comprising
a front wheel braking device of the bicycle comprising:
   a front brake, and
   a front brake control device, comprising:
      a supporting body,
      a front brake control lever articulated on the supporting body and,
      transmission member connecting the front brake and the front brake control lever, and
   a rear wheel braking device of the bicycle which is fully independent from the front wheel braking device comprising:
      a rear brake, and
      a rear brake control device, comprising:
         a supporting body,
         a rear brake control lever articulated on the supporting body and,
         a transmission member connecting the rear brake and the rear brake control lever,
wherein the distance between where the front brake lever is articulated on the supporting body and the transmission member is connected to the control for the front brake control device is less than the comparable distance for the rear brake control device and the front brake control device applies a higher braking force on the front wheel than that applied by the rear brake control device on the rear wheel when substantially the same force is exerted substantially simultaneously on both brake control levers.

19. Brake apparatus for a bicycle, comprising
a front wheel braking device of the bicycle comprising:
   a front brake, and
   a front brake control device, comprising:
      a supporting body,
      a front brake control lever articulated on the supporting body and,
      a front brake transmission member connecting the front brake and the front brake control lever, and
a rear wheel braking device of the bicycle which is fully independent from the front wheel braking device comprising:
   a rear brake, and
   a rear brake control device, comprising:
      a supporting body,
      a rear brake control lever articulated on the supporting body and,
      a rear brake transmission member connecting the rear brake and the rear brake control lever,
wherein the front and rear braking devices operate wholly independently of each other and the front wheel braking device applies a braking force on the front wheel which is higher than that applied on the rear wheel by the rear wheel when the same force is substantially simultaneously exerted on both braking devices.

20. A bicycle braking system comprising;
a front wheel braking device comprising a front brake and a front brake control device, the front brake control device comprising a support body, a front brake control lever articulated on the support body and a first transmission cable connected to the front brake control lever and the front brake; and
a rear wheel braking device, which is fully independent from the front wheel braking device, comprising a support body, a rear brake, and a rear brake control lever articulated on the support body and a second transmission cable connected to the rear brake control lever and the rear brake,
wherein the front wheel braking device applies a higher braking force on the front wheel than the rear wheel braking device applies on the rear wheel when substantially the same force is exerted on both devices.

* * * * *

UNITED STATES PATENT AND TRADEMARK OFFICE
CERTIFICATE OF CORRECTION

PATENT NO. : 6,607,056 B2  Page 1 of 1
DATED : August 19, 2003
INVENTOR(S) : Valentino Campagnolo It is certified that error appears in the above-identified patent and that said Letters Patent is hereby corrected as shown below:

Column 1,
Line 49, delete "SUMMARY OF THE INVENTION."
After the paragraph ending at line 62, and prior to the paragraph beginning at line 63, insert -- SUMMARY OF THE INVENTION --.

Column 3,
Line 15, delete "BRIEF DESCRIPTION OF THE DRAWINGS."
After the paragraph ending at line 20, and prior to the paragraph beginning at line 21, insert -- BRIEF DESCRIPTION OF THE DRAWINGS --.

Column 5,
Lines 37-38, delete "pivot_brake," and insert therefor -- pivot brake --.

Column 6,
Line 28, delete the word "being," and insert therefor -- is --.

Signed and Sealed this

Thirtieth Day of March, 2004

JON W. DUDAS
*Acting Director of the United States Patent and Trademark Office*